Jan. 21, 1964

G. C. FEIGHNER ETAL 3,118,956

ALKYLATION PROCESS

Filed Dec. 27, 1960

INVENTOR.
GEORGE C. FEIGHNER
JIMMIE R. BOWDEN
BY

*Harold M. Dixon*
PATENT AGENT

Jan. 21, 1964

G. C. FEIGHNER ETAL 3,118,956

ALKYLATION PROCESS

Filed Dec. 27, 1960

INVENTOR.
GEORGE C. FEIGHNER
JIMMIE R. BOWDEN
BY

PATENT AGENT

3,118,956
ALKYLATION PROCESS
George C. Feighner, Ponca City, Okla., and Jimmie R. Bowden, Needham Heights, Mass., assignors to Continental Oil Company, Ponca City, Okla., a corporation of Delaware
Filed Dec. 27, 1960, Ser. No. 78,458
17 Claims. (Cl. 260—671)

This invention relates to an improved alkylation process and, fore particularly, it is concerned with the alkylation of aromatic hydrocarbons under conditions resulting in enhanced yield and improved product distribution.

In the alkylation of aromatic hydrocarbons with olefins or other alkylation agents, it is desirable to conduct the reaction at the lowest temperature possible, because in this way side reactions are minimized. We have noted from our experimental work that, at the start of the alkylation reaction in which only fresh catalyst is present, the temperature at which the reaction is effected is relatively lower than what is required in order to maintain the reaction after the reaction has proceeded for a given period of time. The reason for this phenomenon was not understood; therefore a series of experiments were made to determine how the reaction could be conducted at relatively low temperatures throughout the course of the reaction. As a result of our investigation, we had found that product yield and quality can be improved substantially if the method of the present invention were employed, because it enabled us to practice the alkylation with certainty and consistency at a relatively lower temperature than has been possible heretofore.

Therefore, an object of this invention is to provide an improved alkylation process by which product quality and yields are enhanced.

Another object of this invention is to provide an alkylation process utilizing aluminum chloride by which it is possible to operate with certainty and consistency rather than erratically at relatively lower temperatures and thereby achieve the benefits of improved product quality and yield.

Other objects and advantages of our invention will become apparent from the following description and explanation thereof.

In accordance with the present invention, a portion of the total alkylation agent is reacted with an excess of aromatic hydrocarbon in the presence of a portion of the total alkylation catalyts to produce a reaction product including excess aromatic, alkylate, polyalkylate, and sludge. The alkylate, polyalkylate, and excess aromatic are separated from the sludge; and a portion of the hydrocarbon layer is either recycled to the zone of alkylation or passed into a second alkylation zone wherein fresh alkylation agent and catalyst are added for further reaction. Two important effects are achieved by removing sludge before adding fresh catalyst, namely, it permits the use of lower temperatures and makes possible the procurement of improved product quality and yield. The optimum reaction conditions involve reacting the alkylation agent and the aromatic hydrocarbon in the presence of fresh alkylation catalyst. For reasons not clearly understood, the sludge has a harmful effect on the effectiveness of the catalyst in regard to selectivity and activity. Removal of the sludge before addition of fresh catalyst permits operation at lower temperatures without the disadvantage of "losing" the reaction and uncertain or erratic results.

Accordingly, the present invention can be operated on a continuous or batch basis. In the continuous single stage system, the aromatic hydrocarbon and alkylation agent, recycle comprised mainly of excess aromatic hydrocarbon, alkylate, polyalkylate, and catalyst are charged to the alkylation zone along with fresh catalyst. The hydrocarbon product and sludge are removed from the alkylation zone, subjected to treatment for separation of the sludge, the sludge is discarded from the system; and a portion of the reaction product comprised mainly of excess aromatic, alkylate, and polyalkylate is thus recycled to the alkylation zone.

In the multistage system, all of the continuous aromatic and a portion of the fresh catalyst and a portion of the alkylating agent are charged to a first reactor in which the alkylation reaction is carried out. The first total reaction product, including the sludge, flows to a first separating means wherein the sludge is removed, making the total hydrocarbon product available for use in the second stage of the reaction. In the second stage of the reaction, a second portion of alkylation agent is fed continuously along with fresh catalyst. The total effluent flows to a second separating means, and again the sludge is removed therefrom; and the total hydrocarbon product flows to a third reaction zone. As many alkylation-separation stages as desired can be included. By both schemes of continuous operation, it is apparent that the sludge has minimum contact with the fresh catalyst; thus they are ideally suited for the purposes of the present invention.

In the batch process, all of the aromatic hydrocarbon and a portion of the catalyst are charged to the reactor. Then a portion of the alkylating agent is added. Next the hydrocarbon mixture is separated from the sludge by a suitable means such as settling or centrifuging. A second portion of catalyst and a second portion of alkylating agent are added, the sludge is separated, and the hydrocarbon mixture is ready for the third addition of catalyst and alkylating agent. The number of portions the catalyst and alkylating agent are divided into may be as large as desired. From 2 to 20 stages can be used, but it is preferred to use between 4 and 10 stages. More preferably, we employ 4 to 5 stages.

In the alkylation reaction, the aromatic hydrocarbon feed is regulated to provide a high molar excess over the amount of alkylatable compound which is employed. Generally, about 5 to 20 moles of alkylatable hydrocarbon are used in the alkylation reaction. We have found that it is preferable to maintain a molar ratio of at least about 6 to 1, and as high as 15 to 1, of aromatic hydrocarbon to alkylatable compound, to insure that the alkylating agent reacts to give the highest yield of desired product. In this way, there is always present in the reaction zone a relatively high ratio of aromatic hydrocarbon to polyalkylate. The aromatic hydrocarbon reacts with the polyalkylate to produce additional quantities of alkylate; therefore this reaction results in higher yields of the alkylate product. Concomitantly, it is possible, by virtue of avoiding contact of fresh catalyst with sludge, to operate at relatively low temperatures where undesirable side reactions have less tendency to take place.

Generally, the alkylation process of this invention is practiced at a temperature of about 5 to 35° C., more usually about 10 to 25° C., and preferably about 15 to 20° C. The time of reaction will vary considerably, depending on the type of reactants and catalyst employed and the reaction conditions. However, the reaction may require about 5 minutes to 1 hour, and more usually about 10 minutes to 30 minutes.

The present invention is especially adapted for the alkylation of benzene. However, a wide variety of other aromatic compounds can also be alkylated. For the present purpose, benzene and homologs of benzane, including toluene, ethylbenzene, xylene, isopropylbenzene, butylbenzene, etc.; cymene and its homologs; naphthalene and its homologs; etc.

A wide variety of compounds can be used as the alkylating agent in the process. By virtue of their abundance, the olefins are an especially suitable class of alkylating agent for use in the present invention. The olefins include, for example, ethylene, isobutylene, hexylene, octylene, dodecene, etc., the olefins containing from about 5 to 18 carbons atoms, and more particularly 12 to 15 carbon atoms, are especially useful in the alkylation reaction. For the latter tetramers and pentamers of propylene are normally employed. In addition to the olefins, other types of olefin acting paraffins and the alkylating agents, such as alkyl halides corresponding to the olefins mentioned hereinabove may also be used. Specific examples of other alkylating agents are branched and straight chain alkyl chlorides or bromides and isomers thereof.

The catalyst for the reaction is the Friedel-Crafts type. An outstanding example of the catalyst is aluminum chloride which may be promoted with hydrogen chloride for the alkylation reaction. The amount of catalyst which is employed in the alkylation reaction is determined on the basis of the amount of alkylating agent which is present. In general, about 2 to 10 percent by weight of alkylation catalyst is used, based on the alkylatable compound. As previously mentioned, when using aluminum chloride as a catalyst, normally a sludge is formed. If the sludge is permitted to build up in the system, it affects adversely product yield and distribution and the ability to consistently alkylate at a low temperature, by virtue of the undesirable effect it has on the fresh catalyst which is charged to the reaction zone. Consequently, it is important that the quantity of sludge be maintained at a minimum within the system.

To provide a better understanding of the present invention, reference will be had to the following illustrative but nonlimiting specific examples wherein.

Figure 1:
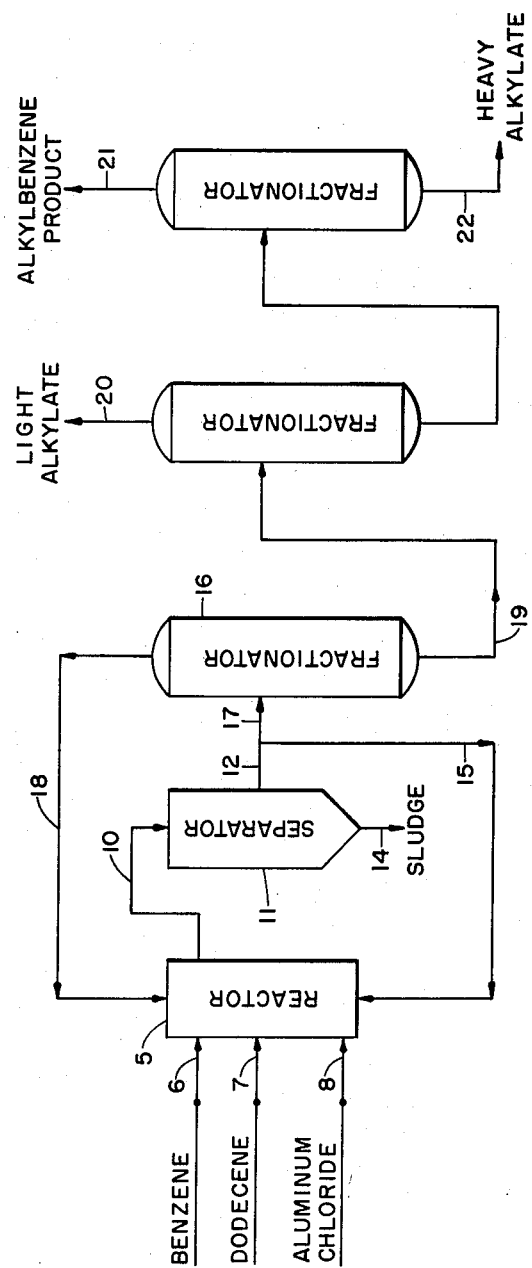
FIGURE 1 illustrates a continuous, single-stage system of operation.

In FIGURE 1, 6.5 pound moles per hour of benzene are fed to the reactor 5 by means of line 6. Similarly, 1-pound mole per hour of dodecene is fed to the reactor 5 by means of line 7; and 8.4 pounds per hour of aluminum chloride contained in a slurry of benzene comprising 9.8 percent by weight of aluminum chloride are fed to the reactor 5 by means of line 8. Although not shown in the drawing, the reactants are very vigorously agitated in the reactor 5 and then discharged therefrom by means of line 10. The total effluent flows through line 10 to a centrifugal separator 11 wherein the hydrocarbon portion of the effluent is separated and discharged therefrom by means of line 12, and the sludge is discarded from the system by means of line 14; 7,400 pounds per hour of the hydrocarbon product are recycled to the bottom of the reactor 5 by means of line 15. The remainder of the hydrocarbon product is charged to a fractionator 16 by means of line 17. In the fractionator, unreacted benzene is produced as an overhead product and discharged therefrom by means of line 18. The unreacted benzene in line 18 is recycled to the top of the reactor 5 at a rate of 6.5-pound moles per hour. The crude alkylate product containing the desired alkylate and polyalkylate is discharged from the fractionator 16 by means of line 19.

In the reactor, the temperature is maintained at 10–25° C. and at atmospheric pressure. By virtue of the conditions maintained in the reactor, the yield of alkylate is substantially higher than if the process had been conducted without removal of sludge and operation at the low temperature as described in connection with FIGURE 1. It is also to be noted that the amount of side products, contained in the effluent, which are discharged from the system by means of lines 20 and 22 is substantially reduced.

Figure 2:
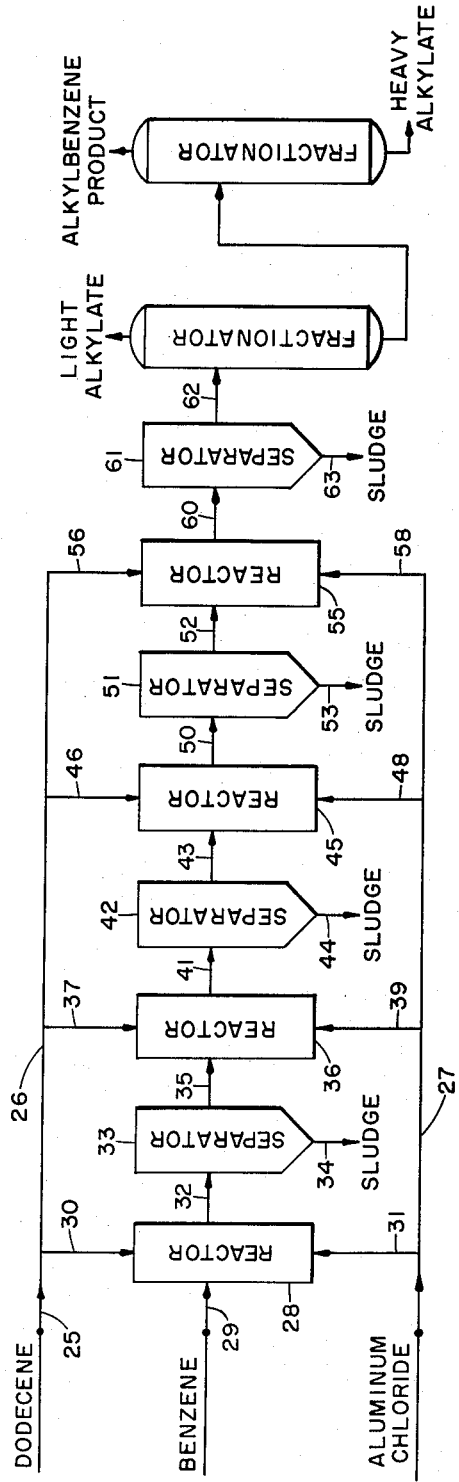
FIGURE 2 is a typical example of a continuous, multistage system utilizing principles of the present invention.

Referring to FIGURE 2, line 25 is a line for initial feed of dodecene, and line 26 is a feed manifold for addition of dodecene to later stages, if desired. Line 27 is the manifold for fresh aluminum chloride catalyst containing 9.8 percent by weight of aluminum chloride slurried in benzene. 6.5-pound moles per hour of benzene are fed to reactor 28 by means of line 29, therefor; and .25-pound moles per hour of dodecene are fed to the reactor 28 by means of line 30, whereas 2.1 pounds per hour of aluminum chloride slurry are fed to the bottom of the reactor 28 by means of line 31. Reactor 28 is maintained at a temperature of 10–25° C. The reactants remain in reactor 28 for an average of about 15 minutes; thence they are discharged therefrom by means of line 32.

The total effluent in line 32 is fed to a centrifugal separator 33 wherein catalyst sludge is separated and discharged therefrom through line 34. The hydrocarbon material is discharged from the separator 33 by means of line 35; then it is fed into reactor 36, and .25-pound moles per hour of dodecene are fed to reactor 36 by means of line 37. Fresh aluminum chloride catalyst in the form of the slurry is charged to the bottom of the reactor 36 by means of line 39 at the rate of 2.1 pounds per hour. After the reactants have been in reactor 36 for .25 hour, the total effluent is discharged therefrom by means of line 41. The temperature in reactor 36 is maintained at 10–25° C. and at a pressure of atmospheric.

The effluent in line 41 is fed to a centrifugal separator 42 wherein the hydrocarbon product is discharged therefrom by means of line 43, and the sludge is discharged through line 44. The hydrocarbon product in line 43 is fed to a reactor 45. Similarly, dodecene is fed at the rate of .25-pound moles per hour to the reactor 45 by means of line 46. Fresh aluminum chloride catalyst in the form of a slurry is fed to the bottom of reactor 45 by means of line 48 at the rate of 2.1 pounds per hour. Reactor 45 is maintained at a temperature of 10–25° C. and at a pressure of atmospheric. The residence time of the reaction in reactor 45 is 15 minutes. At the end of this period, reaction product is discharged from reactor 45 by means of line 50 and then charged to a centrifugal separator 51.

In centrifugal separator 51, the hydrocarbon product is separated from the reaction product and discharged therefrom by means of line 52, whereas the catalyst sludge is discharged by means of line 53. The hydrocarbon product in line 52 is fed to a reactor 55. .25-pound moles per hour of dodecene are fed to the top of the reactor 55 by means of the line 56. Fresh catalyst is fed to the bottom of the reactor 55 by means of line 58 at the rate of 2.1 pounds per hour. The temperature in reactor 55 is maintained at 10–25° C. and at a pressure of atmospheric. The residence time of the reaction mass in reactor 55 is 15 minutes. At the end of that period, the total effluent is discharged from the reactor 55 by means of line 60. The reaction product in line 60 is fed to a centrifugal separator 61 wherein the hydrocarbon product is separated and discharged therefrom by means of line 62. The catalyst sludge is discharged from the centrifugal separator 61 by means of line 63.

In further illustration of the superiority of the present invention over conventional techniques of alkylation, the following comparison is given.

Where the sludge was separated periodically from the reaction mass in the run reported in Table I hereinbelow, it was accomplished by the following method: Dodecene, aluminum chloride and the water promoter were divided into six equal portions. One portion of water and aluminum chloride was added to the benzene with agitation. Five minutes later a portion of dodecene was slowly added to the reaction mass. The total mixture was stirred for a few minutes and the temperature maintained at the starting level by means of a water bath. The agitation was discontinued, and the reaction mass was allowed to settle for about 5 minutes. Thereafter, the sludge was withdrawn, and the cycle was repeated until all portions of reactants and catalyst had been added. At the end of the operation, the reaction mass was stirred for an additional 30 minutes; and then the crude alkylate product was washed, stripped of benzene, and distilled to produce the products mentioned in Table I:

Table I

|  | Run No. 1 | Run No. 2 |
| --- | --- | --- |
| Dodecene, gm | 1,000 | 1,000 |
| Mole ratio, benzene/dodecene | 7.5–1 | 7.5–1 |
| AlCl₃, gm | 50 | 60 |
| Number of settling and draw-off cycles | 6 | 0 |
| Temperature of alkylation, °C | 24–29 | 45 |
| Benzene-free crude, gm | 1,358 | 1,228 |
| Dodecylbenzene, gm | 1,024 | 706 |
| Polydodecylbenzene, gm | 184 | 258 |
| Free oil of dodecylbenzene, percent | 1.38 | 2.49 |

It can be seen that where the sludge was withdrawn periodically from the reaction mass, the yield of dodecylbenzene was significantly higher than the run in which no intermittent separation of sludge was performed. Further, it should be noted that the amount of polydodecylbenzene is significantly less in the case where the intermittent separation of sludge was effected. The same can also be said for the amount of free oil which is associated with the dodecylbenzene product.

What is considered new and inventive in the present invention is defined in the hereunto appended claims, it being understood, of course, that equivalents known to those skilled in the art are to be construed as within the scope and purview of the claims.

We claim:

1. A process which comprises reacting an olefin alkylating agent with an aromatic hydrocarbon in the presence of an alkylation catalyst to produce a reaction product containing excess aromatic hydrocarbon, alkylate, polyalkylate, and sludge, separating excess aromatic hydrocarbon, alkylate, and polyalkylate from sludge and discarding said sludge after separating, combining aromatic hydrocarbon, alkylate, and polyalkylate with olefin alkylating agent and fresh alkylation catalyst to produce a reaction product comprised of enhanced yield of alkylate and a second sludge, which sludge is separated and discarded.

2. A process which comprises reacting an olefin alkylating agent with an aromatic hydrocarbon in the presence of an alkylation catalyst to produce a reaction product containing excess aromatic hydrocarbon, alkylate, polyalkylate, and sludge, successively separating excess aromatic hydrocarbon, alkylate, and polyalkylate from sludge and discarding said sludge after separating, combining aromatic hydrocarbon, alkylate, and polyalkylate with additional olefin alkylating agent and fresh alkylation catalyst to produce a reaction product, comprised of enhanced yield of alkylate and a second sludge, which sludge is separated and discarded.

3. A process which comprises reacting an olefin alkylating agent with an aromatic hydrocarbon in the presence of an alkylation catalyst to produce a reaction product containing excess aromatic hydrocarbon, alkylate, polyalkylate, and sludge, continuously separating excess aromatic hydrocarbon, alkylate, and polyalkylate from sludge and discarding said sludge after separating, combining aromatic hydrocarbon alkylate and polyalkylate with olefin alkylating agent and fresh alkylation catalyst to produce a reaction product comprised of enhanced yield of alkylate and continuously separating and recovering said alkylate and sludge from reaction product and continuously separating said sludge and discarding said sludge after separating.

4. An improved alkylation process which comprises reacting an olefin alkylating agent with an aromatic hydrocarbon and a mixture of alkylate and polyalkylate in the presence of a fresh alkylation catalyst and in the substantial absence of catalyst sludge whereby low temperature alkylation is provided for.

5. A process which comprises reacting an olefin alkylating agent with an aromatic hydrocarbon in the presence of an alkylation catalyst to produce a reaction product containing excess aromatic, alkylate, polyalkylate and sludge, at a temperature of about 10 to 25° C., the ratio of aromatic hydrocarbon to olefin alkylating agent is about 6 to 15:1, separating excess aromatic, alkylate and polyalkylate from the sludge and discarding said sludge after separating, combining alkylate and polyalkylate with olefin alkylating agent, aromatic hydrocarbon and an alkylation catalyst and reacting the same at a temperature of about 10 to 25° C., and the ratio of aromatic hydrocarbon to alkylating agent combined with alkylating agent, alkylate, and polyalkylate being 6 to 15:1 separating a second hydrocarbon fraction comprised of alkylate and polyalkylate from a second sludge fraction and discarding said second sludge fraction after separating.

6. A continuous alkylation process which comprises passing an olefin alkylating agent, an aromatic hydrocarbon, and a fresh alkylation catalyst to a reaction zone, wherein a product containing excess aromatic, alkylate, polyalkylate, and sludge is produced, withdrawing the reaction product from the reaction zone and subjecting the same to a separation treatment resulting in a hydrocarbon fraction comprised of alkylate, polyalkylate and a separate fraction of sludge, discarding said sludge fraction after separating recycling a portion of the hydrocarbon fraction to the reaction zone to which fresh alkylation catalyst is being charged, thereby providing for a relatively low alkylation temperature and an enhanced yield of alkylate.

7. A process which comprises passing an olefin alkylating agent, an aromatic hydrocarbon, and an alkylation catalyst to a first reaction zone wherein a reaction product containing excess aromatic, alkylate, polyalkylate, and sludge is produced, withdrawing the reaction product from the first reaction zone and passing the same to a first separation zone wherein a hydrocarbon fraction of excess aromatic, alkylate, and polyalkylate and a sludge fraction are produced, discarding said sludge fraction after separating, and passing the hydrocarbon fraction, olefin alkylating agent, and fresh alkylation catalyst to the second reaction zone, wherein a second reaction product containing excess aromatic, alkylate, polyalkylate, and a second sludge is produced, passing the second reaction product to a second separation zone wherein a hydrocarbon fraction comprised of alkylate, polyalkylate and a second sludge fraction are produced, discarding said sludge fraction after separating.

8. The process of claim 7 being further characterized by passing the second hydrocarbon reaction to a third reaction zone, passing olefin alkylating agent and fresh alkylation catalyst to the third reaction zone, wherein a reaction product containing excess aromatic, alkylate, polyalkylate, and a second sludge are produced, and passing the third reaction product to a third separation zone wherein a third hydrocarbon fraction containing alkylate, polyalkylate, and a third sludge fraction are produced, discarding said sludge fraction after separating.

9. The process of claim 1 wherein the aromatic hydrocarbon is benzene, and the alkylation catalyst is aluminum chloride.

10. The process of claim 6 wherein the aromatic hydrocarbon is benzene, and the catalyst is aluminum chloride.

11. The process of claim 7 wherein the aromatic hydrocarbon is benzene, and the alkylation catalyst is aluminum chloride.

12. A continuous alkylation process which comprises passing dodecene, benzene, and aluminum chloride to a reaction zone wherein a reaction product containing excess benzene, dodecylbenzene, polydodecylbenzene, and sludge is produced, treating the reaction product to remove sludge, adding fresh aluminum chloride and dodecene to said separated reaction products to the reaction zone.

13. The process of claim 12 being further characterized in that benzene, dodecene, aluminum chloride are being charged continuously to the reaction zone in a manner which provides that there is minimal contact between the fresh aluminum chloride being added and the aluminum chloride sludge.

14. A process which comprises passing benzene, dodecene, and aluminum chloride to a first reaction zone wherein a first reaction product containing excess benzene, dodecylbenzene, polydodecylbenzene, and sludge is produced, passing the first reaction product to a first separation zone wherein a first hydrocarbon fraction containing dodecylbenzene and polydodecylbenzene and a first sludge fraction are obtained, discarding said sludge fraction, passing the first hydrocarbon fraction to a second reaction zone, passing dodecene and fresh aluminum chloride to the second reaction zone wherein a second reaction product containing excess benzene, dodecylbenzene, polydodecylbenzene and sludge is produced, and passing the second reaction product to a second separation zone wherein a second hydrocarbon fraction containing dodecylbenzene, and polydodecylbenzene and a second sludge fraction are obtained, and discarding said sludge fraction.

15. The process of claim 14 being further characterized in that the second hydrocarbon is passed to a third reaction zone, passing benzene, dodecene and fresh aluminum chloride to the third reaction zone wherein a third reaction product containing dodecylbenzene, polydodecylbenzene, and sludge is produced, and passing the third reaction product to a third separation zone wherein a third hydrocarbon fraction containing dodecylbenzene, polydodecylbenzene, and a third sludge fraction is obtained, and discarding said sludge fraction.

16. The process according to claim 2 wherein the reaction product is successively separated from sludge and is combined with alkylating agent and fresh catalyst at least three times in subsequent stages, said sludges recovered from each stage being discarded without reuse in any other alkylation stage.

17. The process according to claim 16 wherein the successive subsequent stages are three in number.

References Cited in the file of this patent

UNITED STATES PATENTS

| | | |
|---|---|---|
| 2,667,519 | Paltz et al. | Jan. 26, 1954 |
| 2,740,807 | Rappen et al. | Apr. 3, 1956 |
| 2,771,496 | Hervert | Nov. 20, 1956 |